United States Patent
Falk

(10) Patent No.: US 6,533,305 B1
(45) Date of Patent: Mar. 18, 2003

(54) MOTORCYCLE FRONT WHEEL SUSPENSION SYSTEM HAVING PNEUMATIC SPRINGS AND A DEDICATED PRESSURE AIR SOURCE

(76) Inventor: Randall G. Falk, 11717 32nd St. N.E., Lake Stevens, WA (US) 98258

( * ) Notice: Subject to any disclaimer, the term of this patent is extended or adjusted under 35 U.S.C. 154(b) by 164 days.

(21) Appl. No.: 09/722,185

(22) Filed: Nov. 27, 2000

(51) Int. Cl.⁷ ............................................... B62K 25/08
(52) U.S. Cl. .................................... 280/276; 180/219
(58) Field of Search ..................... 180/219; 280/276, 280/277

(56) References Cited

U.S. PATENT DOCUMENTS

| | | | | |
|---|---|---|---|---|
| 4,542,910 A | * | 9/1985 | Watannabe | |
| 5,431,426 A | * | 7/1995 | Ijams et al. | |
| 5,743,547 A | * | 4/1998 | Voss et al. | |
| 6,017,047 A | * | 1/2000 | Hoose | |
| 6,241,391 B1 | * | 6/2001 | Hoose | |

* cited by examiner

Primary Examiner—Kevin Hurley
(74) Attorney, Agent, or Firm—Robert W. Jenny

(57) ABSTRACT

A motorcycle front wheel suspension includes a pair of suspension struts mounted in parallel with a pair of fork struts. Each fork strut and suspension strut pair are connected at a bottom end by a link. The two fork struts are connected together by a pair of crossbeams. The top ends of the suspension struts are connected by arms to a crosshead. The crosshead is mounted to the top crossbeam through a pair of pneumatic springs. An axle is mounted to the lower ends of the suspension struts. A pressure air sources is installed on the motorcycle to provide pressure air to the pneumatic springs.

2 Claims, 3 Drawing Sheets

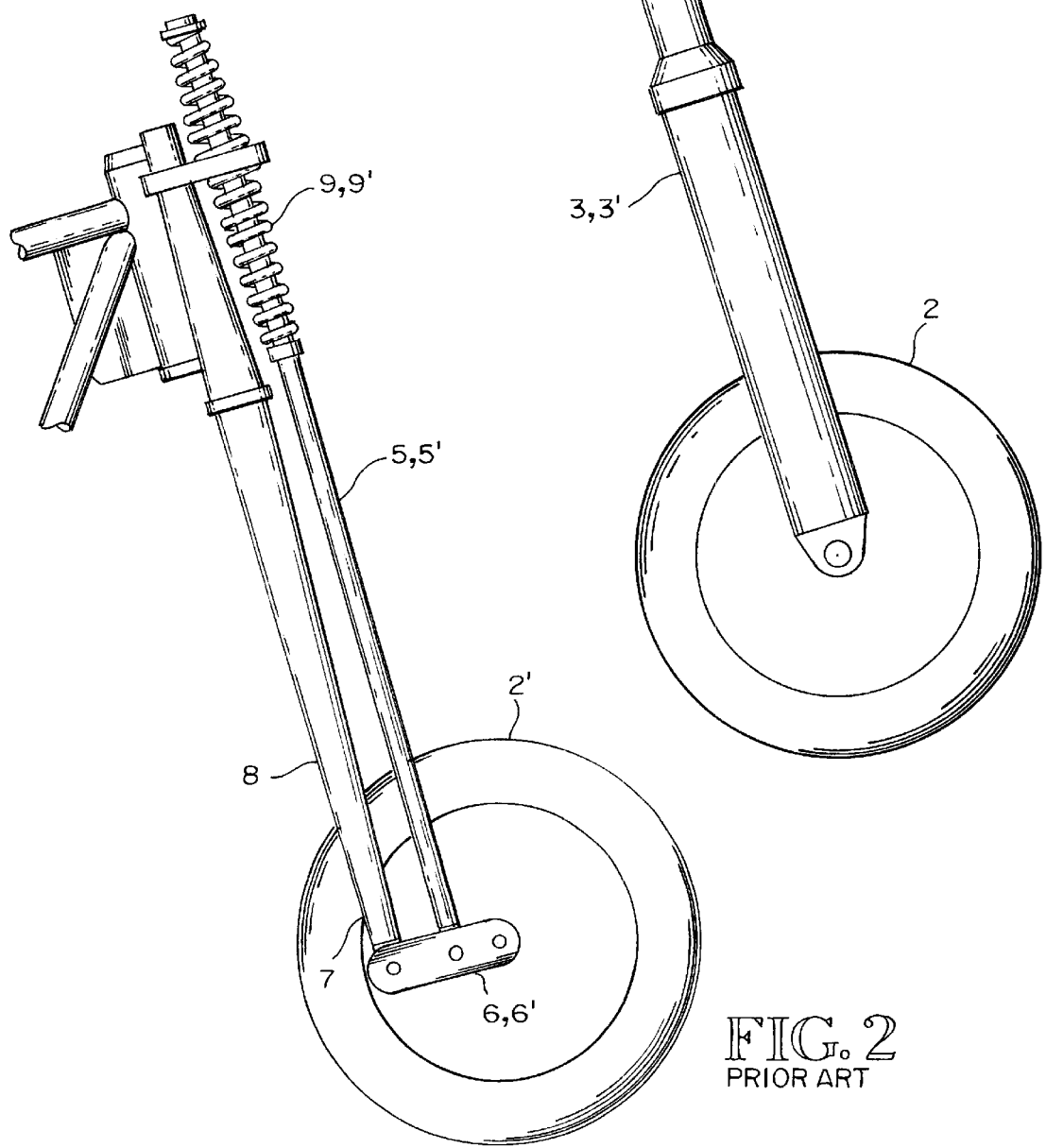

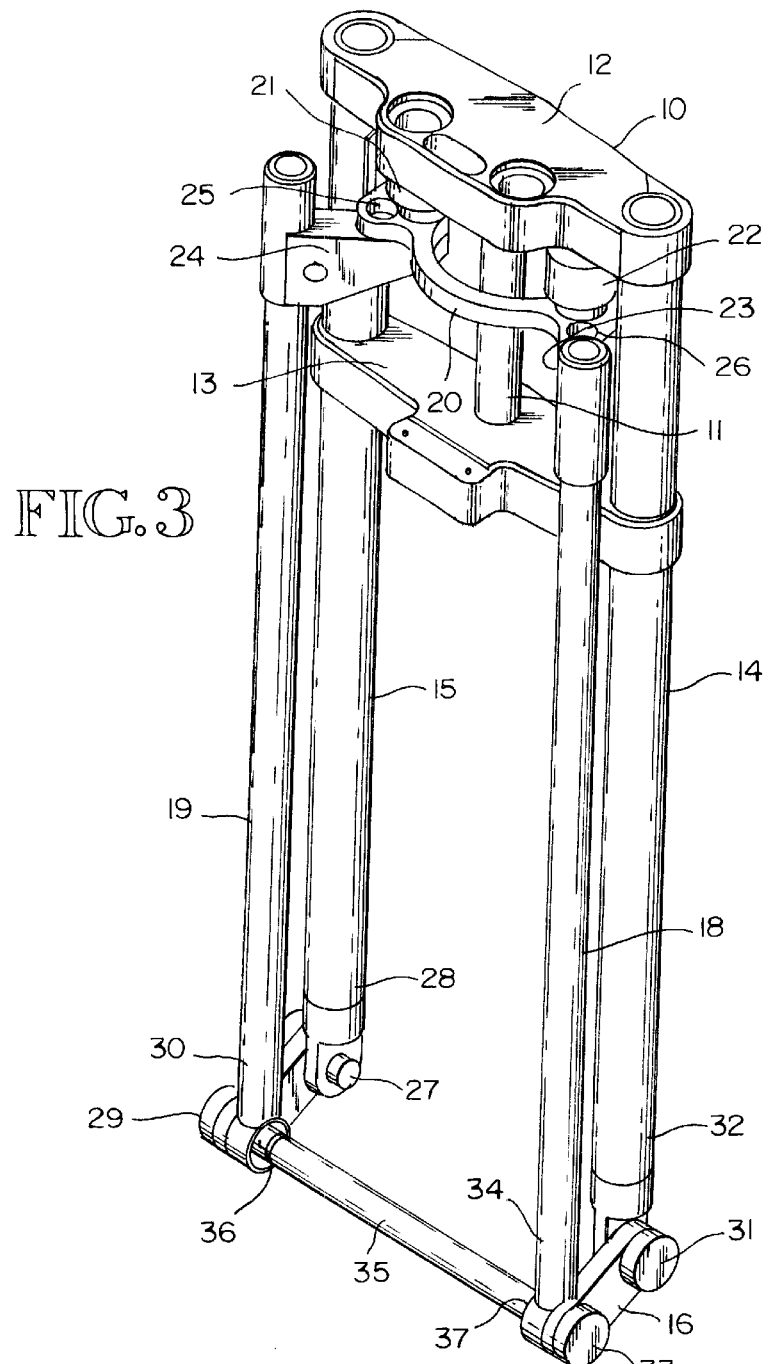
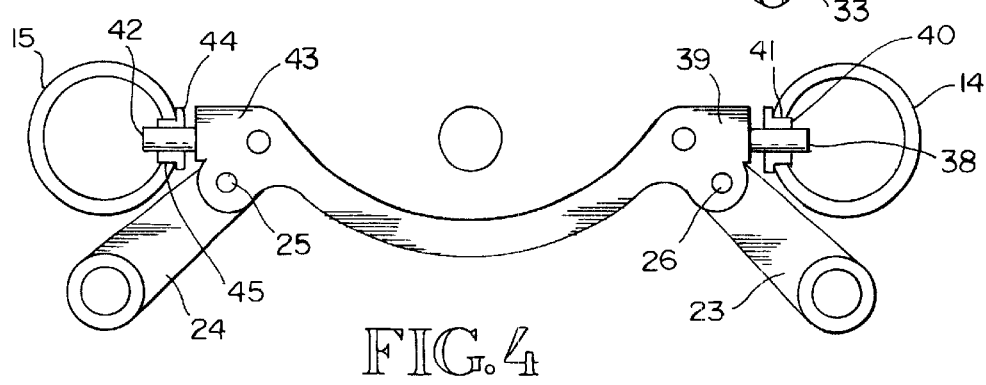

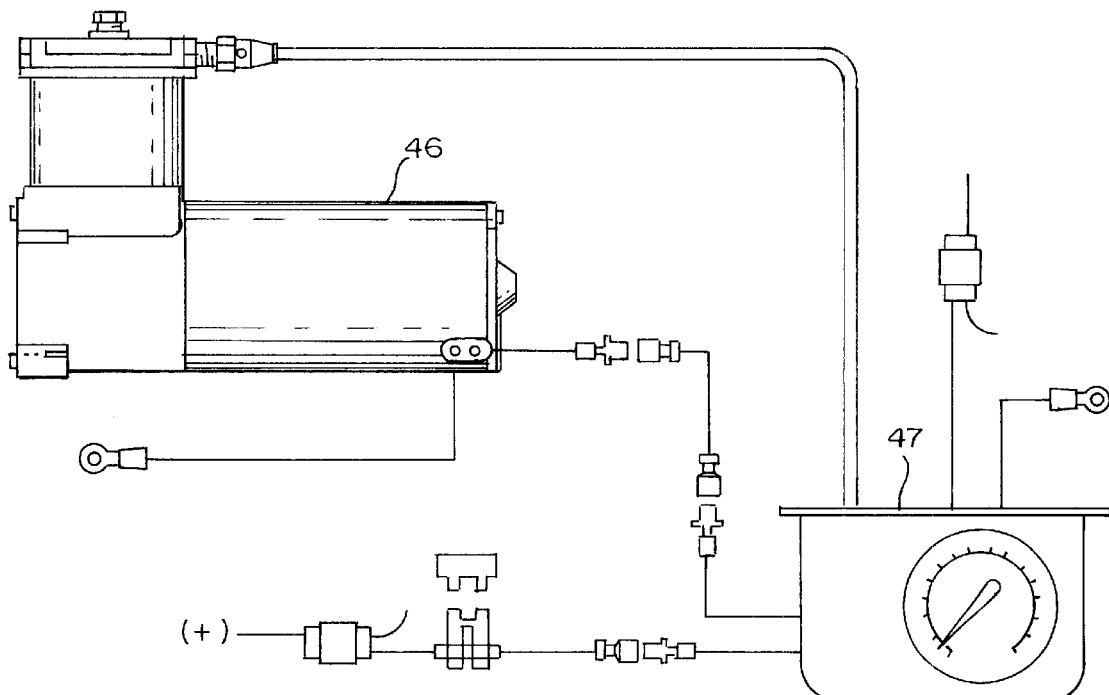
FIG. 5
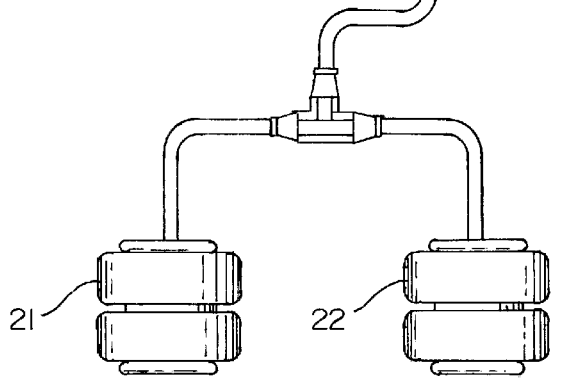

MOTORCYCLE FRONT WHEEL SUSPENSION SYSTEM HAVING PNEUMATIC SPRINGS AND A DEDICATED PRESSURE AIR SOURCE

BACKGROUND OF THE INVENTION

1. Field

The subject invention is in the field of suspension systems for vehicles, i.e. the springs, shock absorbers and mechanism interconnecting the wheels of the vehicle with the primary vehicle structure and mass. In particular it is in the field of suspension systems for the front wheel of a motorcycle.

2. Prior Art

There are two popular types of conventional suspension systems for the front wheel of motorcycles. One type comprises two telescopic struts, one on each side of the wheel. The wheel axle is attached at the lower end of the lower element of each strut. Springs are housed in the struts and they may incorporate shock absorbing features also. A second type comprises struts, levers, links and springs. The wheel axle is carried at one end of each of two short levers. The other ends of these levers are attached to the lower ends of struts extending from the steering pivot. Links are pivotally attached to the levers at points between their ends and these links extend generally upward to be engaged by springs.

These prior art suspensions tend to be relatively expensive, cluttered in appearance and do not have adjustable spring rates to adjust the ride to suit the driver. Also, they are considered marginally stiff in torsion between the wheel and the head end attached to the motorcycle frame. Accordingly, the objective of the subject invention is to provide a motorcycle front wheel suspension which is relatively torsionally stiff, compact, uncluttered in appearance, and has an adjustable spring rate and a dedicated air source.

SUMMARY OF THE INVENTION

The subject invention is a suspension system for the front wheel of a motorcycle. The system mounts on a shaft carried on roller bearings in the neck of the motorcycle frame. The shaft extends above and below the neck. Two crossbeams are attached to the shaft, one to the portion above the neck, the other to the portion below. Two struts are attached to the ends of the crossbeams and extend downward to form the fork assembly to which the wheel is attached. Two links are pivotally attached at one of their ends to the lower ends of the fork struts. The front wheel axle is attached to their other ends. A suspension strut is also attached to each of these ends and the axle. The suspension struts are parallel to the fork struts and their upper ends are attached to a crosshead, the crosshead being guided in slots in the fork struts. Two pneumatic springs are installed between the crosshead and the underside of the upper crossbeam. The axle moves essentially parallel to the plane of the fork struts against the forces applied by the springs. The spring rate is adjusted by adjusting the pressure in the pneumatic springs.

The invention also includes a pressure air source installed on the motorcycle to provide pressure air to the springs.

The invention is described in more detail below with reference to the attached drawings.

BRIEF DESCRIPTION OF THE DRAWINGS

FIG. 1 illustrates a prior art telescopic front wheel suspension system for a motorcycle.

FIG. 2 illustrates a prior art mechanical spring front wheel suspension system for a motorcycle.

FIG. 3 is an isometric drawing of the subject suspension system.

FIG. 4 is a plan view of the crosshead and its engagement with the fork struts.

FIG. 5 is a schematic diagram of the pressure air supply source.

DETAILED DESCRIPTION OF THE INVENTION

The subject invention is a suspension system for the front wheel of a motorcycle.

FIG. 1 illustrates a prior art telescopic suspension system for the front wheel 2 of a motorcycle. Strut(s) 3 and 3' compress and extend under variations in load transfer between wheel 2 and suspension system head 4.

FIG. 2 illustrates a prior art mechanical spring suspension system for the front wheel 2' of a motorcycle. Suspension strut(s) 5 and 5' are attached by lever(s) 6 and 6' to the lower end 7 of fork assembly 8 and engage spring(s) 9 and 9' which compress and extend under variations in load transfer between wheel 2' and the fork assembly.

As shown in FIG. 3, the subject suspension system 10 of the subject invention comprises a shaft 11 which is installable in the journal (neck) (not shown) of a motorcycle, crossbeams 12 and 13, fork struts 14 and 15, links 16 and 17, suspension struts 18 and 19, crosshead 20 and pneumatic springs 21 and 22. For purposes of this disclosure the term pneumatic springs encompasses elastomeric pneumatic springs, piston and cylinder pneumatic springs and cylinder and diaphragm pneumatic springs. The fork struts are mounted in the crossbeams with the upper crossbeam at their upper ends and the second crossbeam spaced a distance below the upper crossbeam in a range of 0.1 to 0.3 of the length of the fork struts. The fork struts and shaft 11 are parallel and shaft 11 is centered between the fork struts. The crosshead is attached to arm 23 on suspension strut 18 and arm 24 on strut 19 by fasteners in holes 25 and 26 respectfully and fasteners (not visible) which attach the pneumatic springs to the crosshead 20. The pneumatic springs are compressed between the crosshead and crossbeam 12. Stub shafts at the ends of the crosshead engage plastic lined slots in the fork struts as shown in detail in FIG. 4, described below.

Link 17 is pivoted at 27 to end 28 of strut 15 and at 29 to end 30 of suspension strut 19. Link 16 is pivoted at 31 to end 32 of strut 14 and at 33 to end 34 of suspension strut 18. Axle 35 is supported in journals 36 and 37 at end 30 of strut 19 and end 34 of strut 18 respectfully.

FIG. 4 is a plan view of the crosshead and its engagement with fork struts 14 and 15, shown sectioned. Stub shaft 38 at end 29 of the crosshead slides in plastic guide 40 which lines slot 41 in strut 14 and stub shaft 42 at end 43 of the crosshead slides in plastic guide 44 which lines slot 45 in strut 15, the struts, slots and plastic guides being sectioned.

FIG. 5 is a schematic diagram of the pressure air supply source. This system is commercially available and is in combination with the suspension system, supplying compressed air at adjustable pressures. The system comprises an electrical motor driven compressor 46 and a pressure gauge and regulator 47. The regulator switches the pump motor on at one lower pressure and shuts it off at an incrementally higher pressure. The air at regulated pressure is fed to the pneumatic springs 21 and 22. The miscellaneous fuse, connectors and conductors connect the pump motor and regulator gauge to each other and to the electrical wiring of the motorcycle.

It is considered to be understandable from this description that the subject invention meets its objectives. It provides a motorcycle front wheel suspension which is torsionally stiff because the four point engagement of the fork and suspension strut assemblies transfers torque loads so that they share the torque loads which occur between the wheel and neck of the motorcycle. The suspension is compact and uncluttered in its appearance due to its simplicity. Further, the spring rate is easily and fully adjustable by adjusting the pressure in the pneumatic springs, using the dedicated pressure air source.

It is also considered to be understood that while certain embodiments of the subject invention are described herein, other embodiments and modifications of those described are possible within the scope of the subject invention which is limited only by the attached claims.

I claim:

1. A motorcycle front wheel suspension system having pneumatic springs and a dedicated pressure air source, said suspension system comprising:

a first fork strut having a first upper end, a first lower end, and a length L, a second fork strut having a second upper end, and a second lower end, and a length L' equal to length L, a first suspension strut having a first suspension strut upper end, a first suspension strut lower end, and a first arm extending from said first suspension strut upper end, a second suspension strut having a second suspension strut upper end, a second suspension strut lower end, and a second arm extending from said second suspension strut upper end, a first link and a second link, a crosshead having a first end and a second end and a first stub shaft extruding from said first end and a second stub shaft extending from said second end, a first crossbeam and a second crossbeam, at least one pneumatic spring, a shaft and an axle, said first and second fork struts being connected parallel to each other by said first and second crossbeams, said first crossbeam being at said first and second upper ends and said second crossbeam being a distance from said first crossbeam, said distance being in a range of 0.1 to 0.3 of length L, each of said crossbeams having a plastic lined slot and being positioned such that said slots face each other, said slots being located between said first and second cross beams, said first and second stub shafts on said crosshead each engaging one of said plastic lined slots, said first arm being connected to said crosshead near said first end of said crosshead and said second arm being connected to said second end of said crosshead, said shaft being installed in said first and second crossbeams, parallel to and centered between said fork struts, said first lower end being linked to said first suspension strut lower end by said first link, said second lower end being linked to said second suspension strut lower end by said second link, said axle interconnecting said first and second suspension strut lower ends and said at least one pneumatic spring being installed between said first and second crossbeams.

2. The suspension system of claim 1 further comprising an adjustable pressure air source connected to said at least one pneumatic spring.

* * * * *